W. B. WOOD.
Corn-Poppers.

No. 149,700.  Patented April 14, 1874.

WITNESSES.
P. C. Dieterich
C. H. Watson

INVENTOR.
W. B. Wood
J. B. Ferriss
per.
ATTORNEYS.

UNITED STATES PATENT OFFICE.

WILLIAM B. WOOD, OF OLMSTEAD, KENTUCKY.

IMPROVEMENT IN CORN-POPPERS.

Specification forming part of Letters Patent No. 149,700, dated April 14, 1874; application filed March 26, 1874.

*To all whom it may concern:*

Be it known that I, WILLIAM BAZZIL WOOD, of Olmstead, in the county of Logan and State of Kentucky, have invented certain new and useful Improvements in Corn-Popper; and I do hereby declare that the following is a full, clear, and exact description thereof, which will enable others skilled in the art to which it pertains to make and use the same, reference being had to the accompanying drawings and to the letters of reference marked thereon, which form a part of this specification, and in which—

Figure 1:
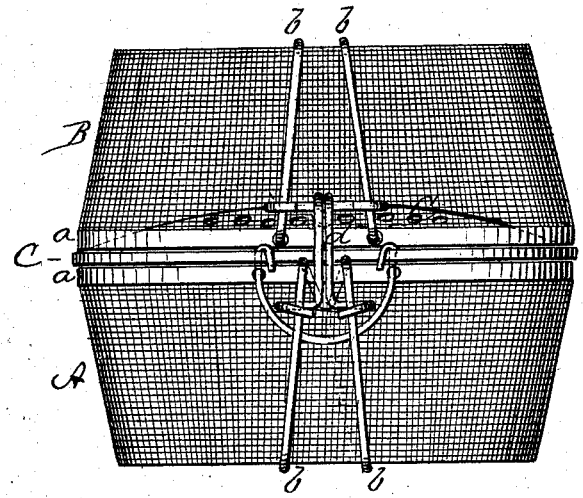
Figure 2:
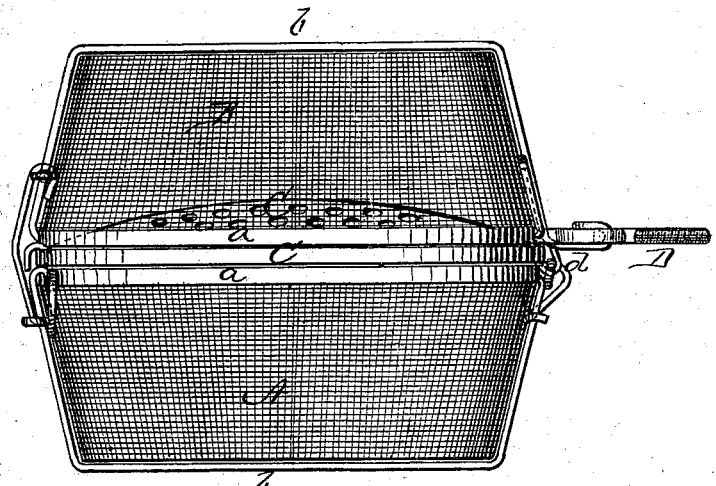

Figure 1 is an end view, and Fig. 2 a side elevation, of my corn-popper.

The nature of my invention consists in the construction and arrangement of a device for popping corn, as will be hereinafter more fully set forth.

A and B represent two circular pan-shaped vessels, made of wire-cloth, bound around the edges with metal strips *a*, and strengthened by means of wires *b b* running from the edge at one side across the bottom and to the edge on the opposite side. C represents a perforated metal disk, provided with a handle, D. The two wire-cloth pans A B are hinged to the perforated disk C at a point directly opposite to the handle D, and close toward the handle, one on each side of the disk, and are fastened to the handle or to the disk at that point, or to each other by suitable catches *d*. The two pans can thus, either or both, be opened, as desired, and both from the operator.

The corn to be popped being placed in the pan A, and both pans locked, the popper is placed with the pan A downward on the stove. Some corn requires longer time to pop than other, and when a portion or that part which requires a short time only is popped, the machine is reversed, when the unpopped corn will fall through the disk C into the pan B, while the already popped corn will remain on top of said disk. This part may be removed or allowed to remain until the balance of the corn is popped.

Having thus fully described my invention, what I claim as new, and desire to secure by Letters Patent, is—

The combination of the perforated disk C with handle D and the two wire-cloth pans A B hinged to the disk, and closing one on each side thereof, substantially as and for the purposes herein set forth.

In testimony that I claim the foregoing as my own I hereby affix my signature in presence of two witnesses.

WILLIAM BAZZIL WOOD.

Witnesses:
G. E. POOR,
W. A. NEWMAN.